Patented Aug. 31, 1948

2,448,155

UNITED STATES PATENT OFFICE 2,448,155

1,3-BIS(O-XENYL)-TRIAZENE

Henry H. Richmond, Guelph, Ontario, Canada, assignor to United States Rubber Company, New York, N. Y., a corporation of New Jersey No Drawing. Application October 18, 1947, Serial No. 780,746

1 Claim. (Cl. 260—140)

The present invention relates to a new chemical compound, namely 1,3-bis(o-xenyl)-triazene, which is believed to have the following structural formula:

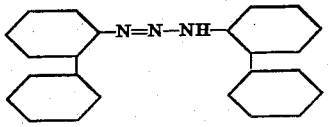

This compound is especially useful as a blowing agent for the manufacture of expanded structures of plastics and rubber as described and claimed in the copending application Serial No. 780,744, filed of even date herewith, in the name of the present applicant and another.

The compound 1,3-bis(o-xenyl)-triazene is a new organic chemical blowing agent having unusual freedom from discoloring the product, having unusual ability for highly expanding the rubber or other plastic, imparting unusually good aging properties to the rubber product, being readily stored without decomposition or deterioration and with safety, producing uniform, medium sized cells throughout the expanded product, having freedom from causing blooming or bleeding of the product and being stable under milling conditions so that it can be milled into the rubber mix without decomposition. The blown rubber made using this agent does not stain cloth.

The compound 1,3-bis(o-xenyl)-triazene has the unique and unexpected advantage over 1,3-bis(p-xenyl)-triazene that the ortho compound is free from discoloration of rubber so that colored expanded rubber of a wide variety of colors and tints including light shades can be prepared readily therewith whereas the para compound discolors white sponge compound to a lemon-yellow color which turns reddish-brown after cure and so is not suitable for the preparation of colored expanded rubber.

The compound 1,3-bis(o-xenyl)-triazene has the additional advantage that it can be readily and economically manufactured because a high yield is obtained from the starting material, o-xenylamine, which is a by-product in the manufacture of p-xenylamine and hence is readily available.

The compound 1,3-bis(o-xenyl)-triazene decomposes at temperatures of 130–135° C. producing 67.4 cc. of nitrogen (measured at 760 mm. and 25° C.) for each gram of the compound decomposed.

Triazenes are usually prepared by the diazotization of the mineral and salts of aromatic amines in aqueous solution followed by further condensation with additional amine in neutral or weakly acid media. This method has been used satisfactorily for the preparation of 1,3-bis(o-xenyl)-triazene from o-xenylamine as illustrated in Example I below. However a more satisfactory method for its manufacture is that disclosed in my copending application Serial No. 780,745, filed of even date herewith, in accordance with which o-xenylamine and an alkyl nitrite, especially methyl nitrite, are reacted in an aromatic hydrocarbon or aromatic halide solvent such as benzene, toluene, or chlorobenzene. This process has the advantage that the o-xenylamine and the alkyl nitrite are both soluble in the solvent employed while the triazene is insoluble therein and is precipitated from the reaction medium whereupon it may be recovered by simple separation, as by ordinary filtration, from the reaction mixture.

Use of the latter method is considerably more economical than the method using diazotization since it avoids the use of acetic acid which is difficult to recover.

The use of methyl nitrite generated in a zone separated from the reaction zone is especially advantageous and is disclosed in detail in my copending application mentioned above. This method is exemplified in Example II below.

Following are examples of methods of preparing the new compound of the present invention, namely 1,3-bis(o-xenyl)-triazene.

Example I

To a solution of 8.5 g. of o-xenylamine in 8. 5 cc. of concentrated hydrochloric acid (440 gms. hydrogen chloride per liter) and 300 cc. of water, there was added over fifteen minutes with stirring and cooling with ice water, a solution of 3.5 g. of 97% sodium nitrite in 30 cc. of water, keeping the temperature at 5° C. After stirring for another half hour there was added a solution of 6.8 g. sodium acetate in 15 cc. of water followed by the addition of a solution of 7.5 g. of o-xenylamine and 6.8 g. of sodium acetate in 100 cc. of acetic acid with stirring, the temperature being about 10° C., causing the rapid separation of a solid. After stirring for one hour the solid was filtered off and washed with water. Yield was 15.5 g. or 93% of theory. The product had a melting point of 162–163° C.

Example II

To a one liter three-necked flask equipped with a dropping funnel, a sealed stirrer and a water-cooled condenser, there was added 32 g. (0.46 mole) sodium nitrite, 20 cc. (0.50 mole) methanol and 20 cc. of water. The water-cooled condenser was connected to the inlet tube of another reactor which consisted of another one liter three-necked flask equipped with the above mentioned inlet-tube, a sealed stirrer, a water-cooled condenser and a thermometer. Into the second reactor there was placed a solution of 70 g. (0.41 mole) of o-xenylamine in 300 cc. of toluene. Both stirrers were started, and into the first reactor there was dropped over a period of forty-five minutes, 51 cc. of sulfuric acid solution made up from two volumes of water and one volume of 95% sulfuric acid. The generated methyl nitrite gas bubbled through the o-xenylamine solution. The temperature rose from room temperature to 30° C. over the addition period. After stirring a few minutes subsequent to the addition period until methyl nitrite ceased formation, the clear reaction solution was allowed to stand. After several hours when a precipitate of the triazene began to form, the stirring was renewed to keep the mixture broken up. The precipitation is complete in 12–24 hours. The first crop of triazene was then filtered off and washed with toluene. The filtrate was concentrated under partial vacuo to about 100 cc., recovering methanol and toluene. A second crop was obtained from the concentrate on cooling. Total yield was 65.7 or 89% of the theoretical. The composite product had a melting point of 159–60° C. The methanol and toluene were recovered by fractionation.

1,3-bis(o-xenyl)-triazene has a melting point of approximately 160° C., the exact melting point depending upon its purity. It will be noted that the melting point of the product of Example I was 162–163° C. whereas that of the product of Example II was 159–60° C. The melting point of pure 1,3-bis(o-xenyl)-triazene is 165° C. with decomposition.

Having thus described my invention, what I claim and desire to protect by Letters Patent is:

As a new chemical compound, 1,3-bis(o-xenyl)-triazene.

HENRY H. RICHMOND.

REFERENCES CITED

The following references are of record in the file of this patent:

Ber. der Deut. Chem. Ges., vol. 58B, page 1914 (1925).